United States Patent
Uneta et al.

(10) Patent No.: US 7,438,738 B2
(45) Date of Patent: Oct. 21, 2008

(54) AIR CLEANER DEVICE FOR MOTORCYCLE

(75) Inventors: Hisashi Uneta, Wako (JP); Yuji Noguchi, Wako (JP); Isao Azumagakito, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 559 days.

(21) Appl. No.: 11/085,205

(22) Filed: Mar. 22, 2005

(65) Prior Publication Data
US 2005/0217633 A1    Oct. 6, 2005

(30) Foreign Application Priority Data
Mar. 31, 2004 (JP) ............................. 2004-102958

(51) Int. Cl.
*B60K 13/02* (2006.01)
*B62K 11/08* (2006.01)

(52) U.S. Cl. ............ 55/385.3; 55/DIG. 28; 55/DIG. 30; 123/198 E; 180/219; 180/225; 180/226

(58) Field of Classification Search ................ 55/385.3, 55/DIG. 28, DIG. 30; 123/198 E; 180/219, 180/225, 228
See application file for complete search history.

(56) References Cited

U.S. PATENT DOCUMENTS

| 4,402,379 | A  | * | 9/1983  | Hoshi ........................ 180/225 |
| 6,325,169 | B1 | * | 12/2001 | Tateshima et al. ........... 180/219 |
| 6,478,105 | B2 | * | 11/2002 | Okuma ....................... 180/219 |
| 6,688,274 | B2 | * | 2/2004  | Yokoyama et al. ....... 123/198 E |
| 7,179,315 | B2 | * | 2/2007  | Huang ......................... 55/337 |
| 2005/0051375 | A1 | * | 3/2005 | Momosaki .................. 180/219 |

FOREIGN PATENT DOCUMENTS

JP    7-151029    6/1995

* cited by examiner

*Primary Examiner*—Duane Smith
*Assistant Examiner*—Minh-Chau T. Pham
(74) *Attorney, Agent, or Firm*—Westerman, Hattori, Daniels & Adrian, LLP.

(57) ABSTRACT

An air cleaner device for a motorcycle including a cylindrical filter element disposed in a box of an air cleaner, wherein air purified by the element is sent to an air-intake system. Further, a rectifying member is disposed around the outer periphery of the cylindrical filter element at a predetermined distance apart therefrom and the rectifying member is formed into a cylindrical shape so as to cover the entire outer periphery of the element.

3 Claims, 8 Drawing Sheets

AIR CLEANER DEVICE FOR MOTORCYCLE

FIELD OF THE INVENTION

The present invention relates to an air cleaner device for a motorcycle and, more specifically, to the same having an air cleaner provided with a cylindrical element.

RELATED ART

There is an air cleaner device for a motorcycle including a cylindrical element in a box of an air cleaner disposed below a seat and is adapted to send air purified thereby to a carburetor. It is also known that a portion around the element is partly covered, for example, by an inverted U-shaped rectifying member (See Patent Document JP-A-7-151029).

The rectifying member can rectify airflow with respect to the element. However, since it covers partly in substantially the inverted U-shape, the airflow taken by the element is easily affected by change of a negative pressure of intake air or by a shape of the box of the air cleaner. In other words, although the box of the air cleaner, which is an air-intake vacuum member, sucks outside air in a flow velocity corresponding to the negative pressure, the flow velocity or the direction of air on the surface of the element varies with the shape of the air cleaner or the change of the negative pressure of intake air.

At this time, by rectifying airflow by the rectifying member, variations in airflow can be restrained. However, the rectifying member in the related art was provided locally, the airflow with respect to the element may be affected by the shape of the box of the air cleaner and thus the flow velocity or the direction may vary, and hence air is taken locally from a portion of the surface of the element at which the negative pressure of the intake air required by the engine is the highest, whereby purification of the intake air is done not by the entire element but by part of the same. Consequently, improvement of efficiency of purification cannot be achieved easily, and hence it is desired to control the airflow coming into the element to be constant. However, the airflow is significantly affected by the shape of the air cleaner, it is impossible to quantify the airflow, and hence it was required to set the quantity of the airflow by repeating trial and error for each air cleaner according to the shape thereof.

In addition, when the negative pressure of the intake air varies due to a throttle opening or a state of a road surface, variations of the airflow entering into the element increase, whereby the characteristic of excessive intake air such that an air-intake portion of the element changes and hence the efficiency of purification varies is actualized. In particular, when the engine revolution is low, that is, the throttle opening is small, quantity of the intake air decreases and hence the affect of the shape of the box of the air cleaner on the airflow becomes obvious.

SUMMARY OF THE INVENTION

Accordingly, it is an object of the present invention to optimize the negative pressure of intake air and direction of airflow with respect to an element without being affected by the shape of a box of an air cleaner.

In order to solve the problem described above, an air cleaner device for a motorcycle is an air cleaner device for a motorcycle including a cylindrical including a cylindrical element disposed in a box of an air cleaner, wherein air purified by the element is sent to an air-intake system from an opening provided on the box, wherein a rectifying member is disposed around the outer periphery of the element at a predetermined distance apart therefrom and the rectifying member is formed into a cylindrical shape so as to cover the entire outer periphery of the element.

In addition to the description above, the invention is also characterized in that an exit of purified air is formed on a front wall of the box of the air cleaner, and an opening of the exit is covered by the element, and in that the cylindrical rectifying member is opened at the rear, and an air intake port for taking outside air into the box of the air cleaner is provided rearwardly of the rectifying member.

In addition, the invention is also characterized in that the air cleaner device is disposed in a space surrounded by a seat on the upper side, a rear fender on the lower side, and side covers on left and right sides.

The rectifying member is formed into a cylindrical shape, and covers the entire outer periphery of the element at a predetermined distance. Therefore, air flowing into the element is rectified to be constant in a flow velocity and direction. Consequently, the air flowing into the element can hardly be affected by the shape of the box of the air cleaner, and is flown into the entire element uniformly in a dispersed manner. Therefore, the directionality and the negative pressure of the airflow which flows into the entire element can be optimized while being less affected by the shape of the box of the air cleaner. Also, by purifying air with the entire element, the efficiency of purification can be improved, and hence improvement of output of the engine is achieved.

Furthermore, the above-described effect of rectification can be maintained even when the negative pressure of the intake air varies due to the change of the throttle opening or the like. Therefore, the airflow can be maintained constant and stabilized without being affected by the shape of the box of the air cleaner even when the engine revolution is low.

In addition, the rectifying member may be shaped like a bell mouth, which is opened toward the rear, and the outside air is taken from the rear. Therefore, the outside air can be taken efficiently into the rectifying member, and air containing less water and less dust can be taken in. In addition, the purified air can be delivered efficiently through the element which is located in front thereof to the air-intake system located forwardly thereof.

Further, since the space surrounded by the seat on the upper side, the rear fender on the lower side, and the side covers on the left and right sides is provided, and the air cleaner device is arranged therein, the space for arranging the air cleaner device can easily be secured. In addition, at least part of the members constituting the space can be utilized for constituting the air cleaner device.

BRIEF DESCRIPTION OF THE DRAWINGS

A preferred embodiment of the present invention will be described with reference to the accompanying drawings, wherein.

DETAILED DESCRIPTION OF THE INVENTION

Figure 1:
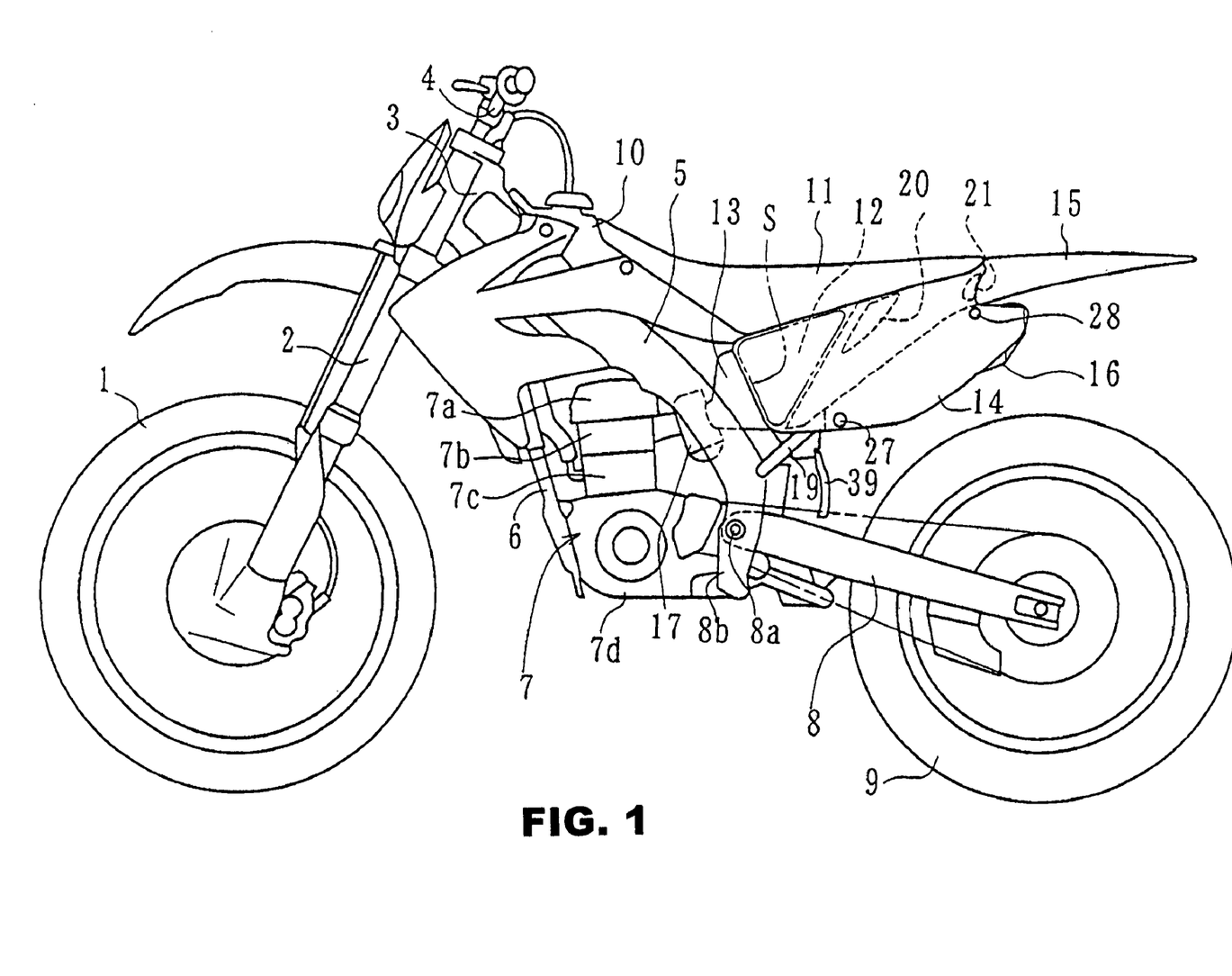
FIG. 1 is a left side view of an off-road type motorcycle to which the present invention is applied.

Referring now to the drawings, an embodiment will be described. FIG. 1 is a left side view of an off-road type motorcycle to which the present invention is applied. Reference numeral 1 in the drawing designates a front wheel, reference numeral 2 designates a pair of left and right front forks for supporting the front wheel 1 from both sides, reference numeral 3 designates a head pipe for steerably journaling the front forks 2, reference numeral 4 designates a handle, reference numeral 5 designates a main frame, reference numeral 6 designates a down frame, reference numeral 7 designates an engine, reference numeral 7a designates a cylinder head cover of the engine, reference numeral 7b designates a cylinder head, reference numeral 7c designates a cylinder, reference numeral 7d designates a crankcase, reference numeral 8 designates a rear arm, reference numeral 8a designates a pivot for pivotably journaling the front end of the rear arm 8 on a pivot plate 8b extending downward from the rear end of the main frame 5, reference numeral 9 designates a rear wheel, reference numeral 10 designates a fuel tank, reference numeral 11 designates a seat, reference numeral 12 designates an air cleaner, and reference numeral 13 designates a connecting tube.

The air cleaner 12 is disposed in a space S (slightly downsized and shown by an imaginary line in the drawing) surrounded by a seat 11 on the upper side, a rear fender 15 on the rear side from below, and side covers 14 on the left and right sides, and hence the upper side is covered by the seat 11, the left and right sides are covered by the side panels 14, and the rear portion is covered by the rear fender 15 from below. Reference numeral 16 designates a muffler. The air cleaner 12 delivers purified air through the connecting tube 13 to a carburetor 17 disposed in front thereof, where supplied air is turned into an air-fuel mixture and is supplied to the engine 7.

Figure 2:
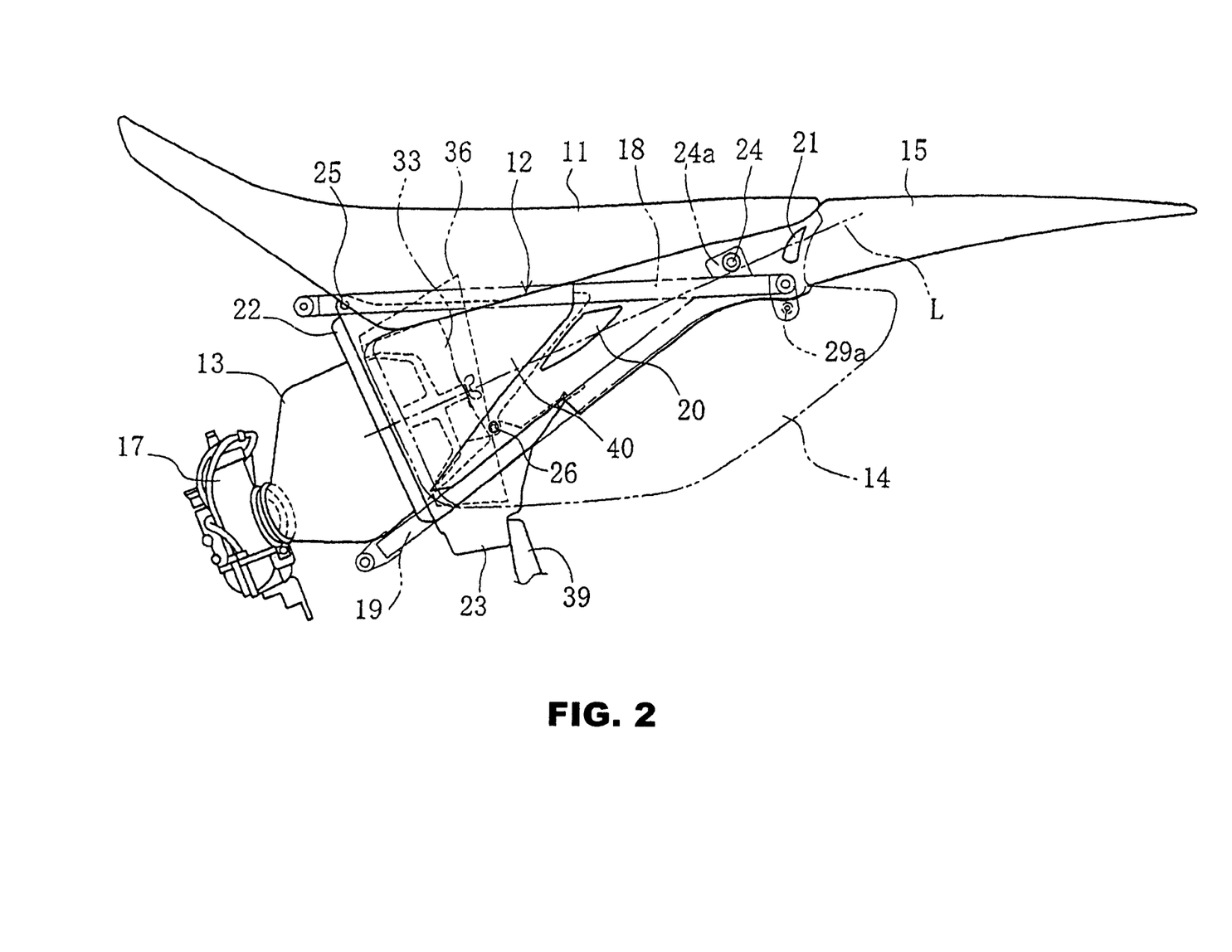
FIG. 2 is a side view of an air cleaner and peripheral members thereof.

FIG. 2 is a side view of the air cleaner 12 and peripheral members thereof (the side panel 14 is indicated by an imaginary line). A seat rail 18 extending from the main frame 5 obliquely upwardly toward the rear, and a rear stay 19 is disposed below seat rail 18 so as to form a triangular shape with the seat rail 18 on left and right sides in pairs. The seat rail 18 and the rear stay 19 constitute a vehicle body frame together with the main frame 5 and the down frame 6. The air cleaner 12 is disposed between the left and right seat rail 18 and the rear stay 19, and an upper portion of the rear side of the rear fender 15 is supported at the rear end of the seat rail 18 via a mounting member 24.

The rear fender 15 extends in the fore and aft direction at the rear portion thereof so as to cover the top of the rear wheel 9, and a front portion, which is opened upward and frontward and is hollow inside, extends obliquely downward toward the front below the seat 11 and is connected to the rear portion of the air cleaner 12. A hollow portion at the front portion of the rear fender 15 defines an inner space opening toward the front by being covered by the seat 11 on the upper side thereof, and is in communication with an inner space of the air cleaner 12.

On a side surface of the rear fender 15, which is located below the seat 11, there is a front air intake port 20, and a rear air intake port 21 is disposed in front and rear thereof. The front air intake port 20 and the rear air intake port 21 open toward the rear on the inner side of the side panel 14 respectively, and outside air is taken therethrough into the internal space of the rear fender 15 and is introduced into the air cleaner 12.

The front air intake port 20 and the rear air intake port 21 are arranged so as to align on an imaginary straight line L extending substantially in parallel with the lower end of the seat 11 toward the center of a cylindrical element 33 (described later) provided in the air cleaner 12. The front air intake port 20 and the rear air intake port 21 are at higher levels than the center of the air cleaner 12, and the rear air intake port 21 is located at a higher level than the front air intake port 20.

The rear end of the connecting tube 13 is connected to a front wall 22 of the air cleaner 12, and air purified by the air cleaner 12 passes through the connecting tube 13 and is delivered to the carburetor 17 located in front. A mudflap 39 is attached to a bottom 23 of the air cleaner 12 so as to extend downward. A midsection in the fore-and-aft direction of the rear fender 15 which is connected to the rear portion of the air cleaner 12 is mounted to a stay 24a provided on the seat rail 18 via the mounting member 24.

An upper front portion of the air cleaner 12 is mounted to the seat rail 18 via a mounting member 25. The reference numeral 26 in the drawing is a connecting member between the air cleaner 12 and the front portion of the rear fender 15. The side panel 14 covers the major part of the side surface of the air cleaner 12, and an upper portion of the side panel 14 is connected to a rear portion of the seat 11, so as to cover the connecting member of the air cleaner 12 with respect to the seat 11 and the rear fender 15. As shown in FIG. 1, the front side is mounted to the rear stay 19 via a mounting member 28 and the rear portion is mounted to a stay 29a (FIG. 2) provided at the rear end of the seat rail 18 via a mounting member 29.

Figure 3:
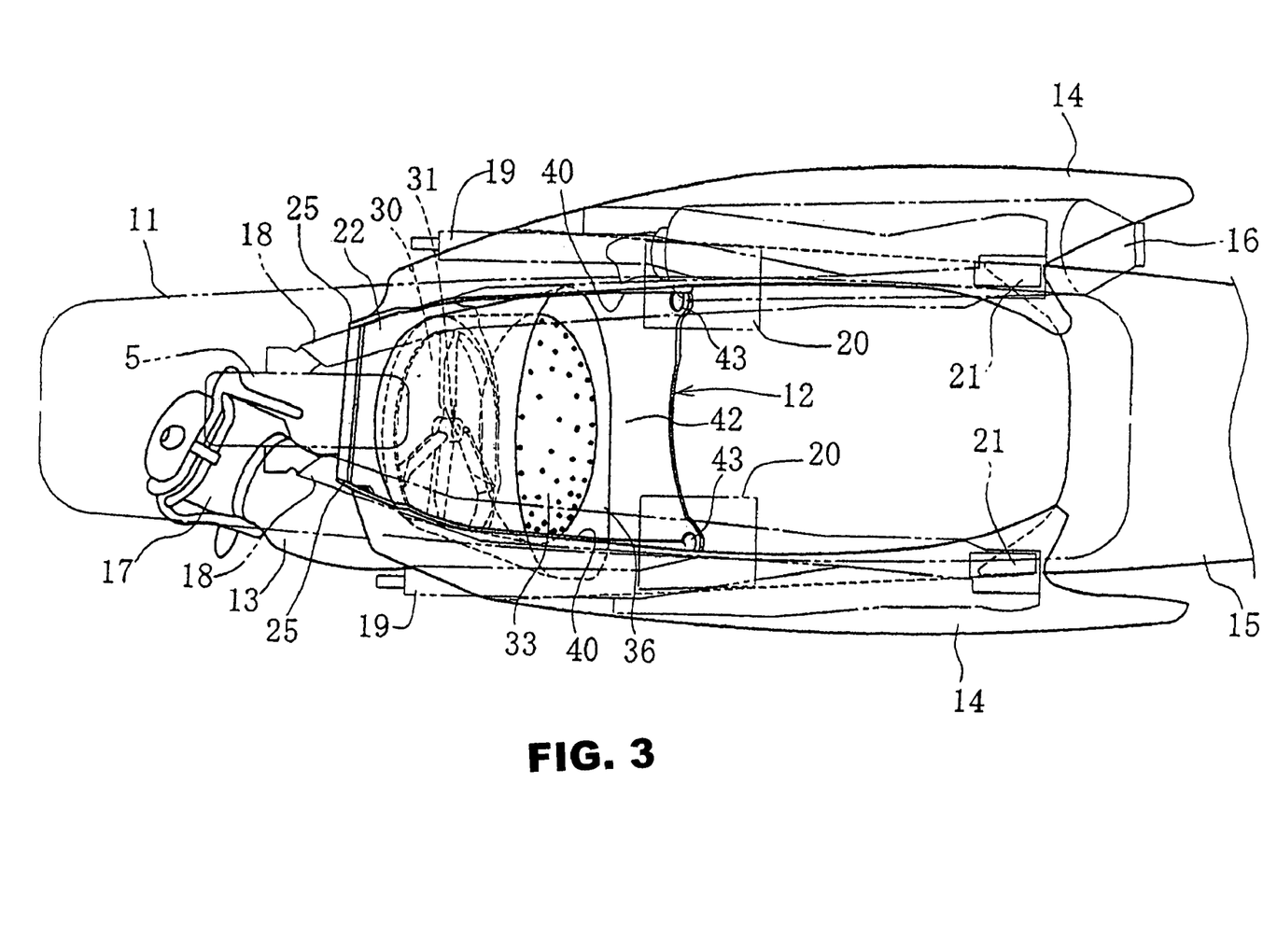
FIG. 3 is a plan view of the portion shown in FIG. 2.

FIG. 3 is a plan view of the portion shown in FIG. 2, in which the seat 11 is represented by an imaginary line. The air cleaner 12 and the front portion of the rear fender 15 are opened on top, and this opened portion is covered by the seat 11. The connecting tube 13 is connected to the front wall 22, is bent outward to the left so as to avoid interference with a shock absorber (not shown) of a rear suspension and is connected to the carburetor 17.

The side panels 14, 14 are provided in pair on the left and right sides so as to cover the outsides of the air cleaner 12, extend rearwardly beyond the air cleaner 12 while swelling outward, and further extend rearward beyond the rear end of the muffler 16. The front air intake port 20 and the rear air intake port 21 are formed on the left and right sides of the rear fender 15 respectively. A rectifying member 36 (described later) for covering the periphery of the element 33 extends toward the front so as to increase in diameter until it reaches the insides of left and right side walls 40, which constitutes the air cleaner 12.

Figure 4:
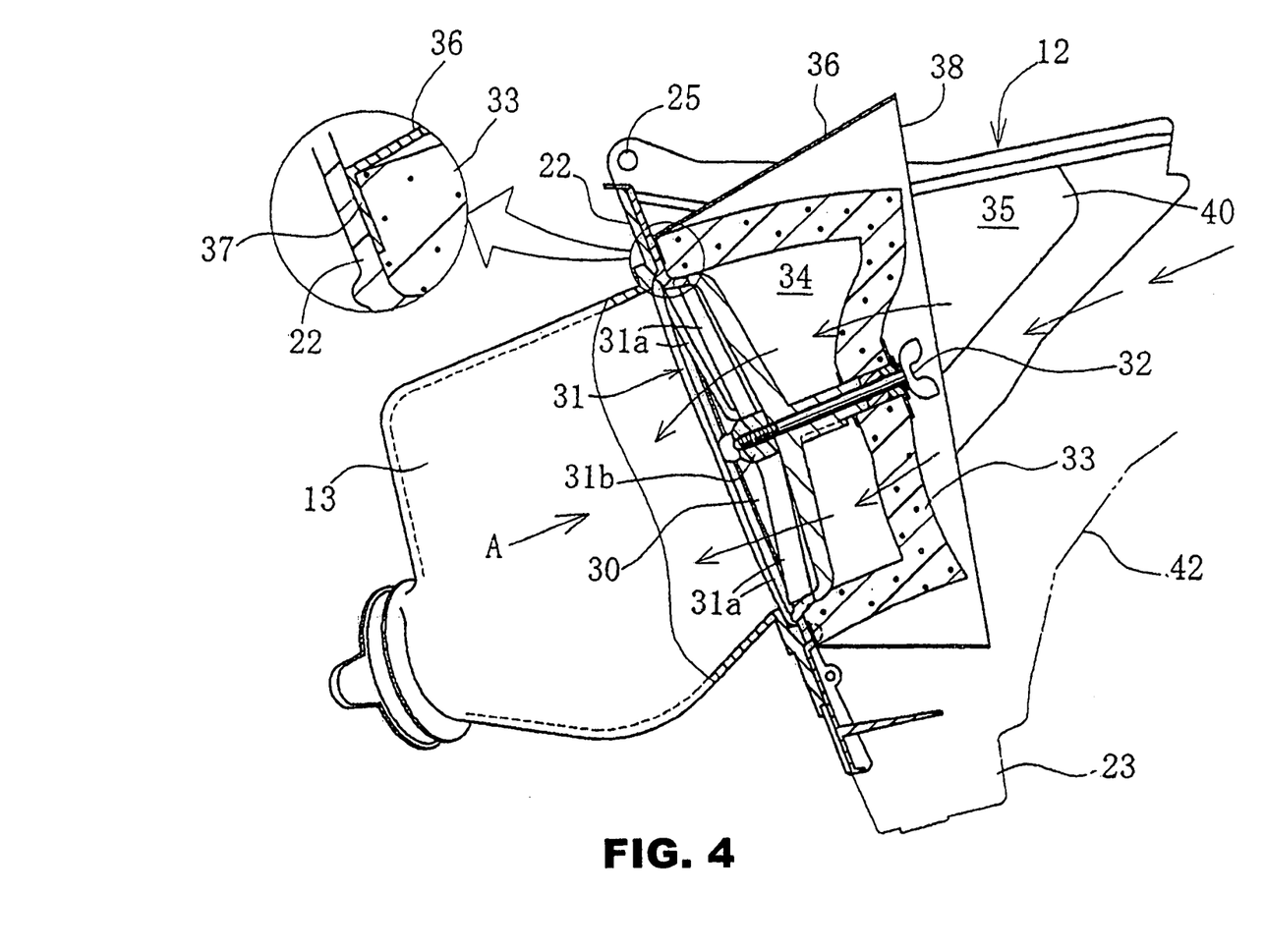
FIG. 4 is a side, cross-sectional view of an air cleaner box.
Figure 7:
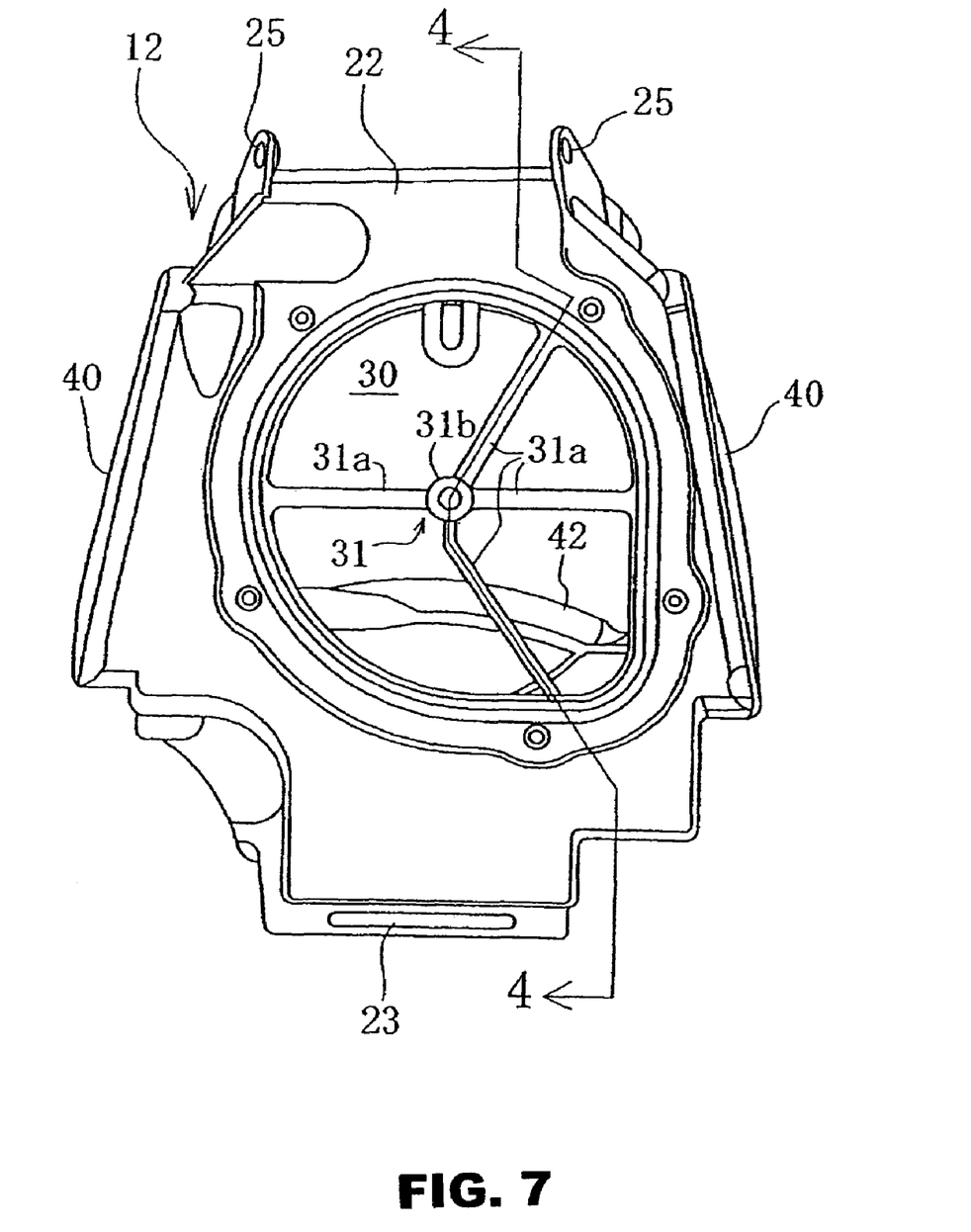
FIG. 7 is a drawing when viewed in the direction indicated by an arrow A in FIG. 4.

FIG. 4 is a side cross-sectional view of the air cleaner 12 taken along a line 4-4 in FIG. 7. The front wall 22 is formed with an opening 30, and the rear end of the connecting tube 13 is hermetically connected thereto. The opening 30 is provided with a holder 31 formed at the center thereof, and the element 33 formed substantially into a cylindrical shape is mounted to the holder 31 from behind via a bolt 32. The holder 31 is provided with a plurality of arm portions 31a extending substantially radially, and a boss 31b serves as a hub therefore. The boss 31b is located substantially at the center of the opening 31, and the distal end of the bolt 32 is tightened to an insert nut which is integrated therewith.

The element 33 is formed of a known filter material such as a sponge type substance formed into the shape of a bottomed cylinder, and partitions the interior of the air cleaner 12 into a clean side 34 and a dirty side 35. The entire circumference of the outer periphery of the element 33 is covered by the rectifying member 36. The rectifying member 36 is formed into a bell mouth shape, and the front opening side is formed with an inwardly directed flange 37. The rectifying member 36 is fixed simultaneously when mounting the element 33 without using an additional mounting member by clamping the flange 37 between the front end of the element 33 and the front wall 22.

The rectifying member 36 is formed of a suitable material such as a resin material sheet or the like, and is opened at the rear and is formed substantially into a truncated conical shape which increases in diameter toward the rear. Such a shape in which an opening side at one end (corresponds to a rear opening 38) is larger in diameter than the other opening side is referred to as the bell mouth shape. Such a form that the opening on the distal end on a larger-diameter side warps outward in cross section may also be employed, and in such a shape having a curved cross-section is specifically referred to as a funnel shape.

Figure 5:
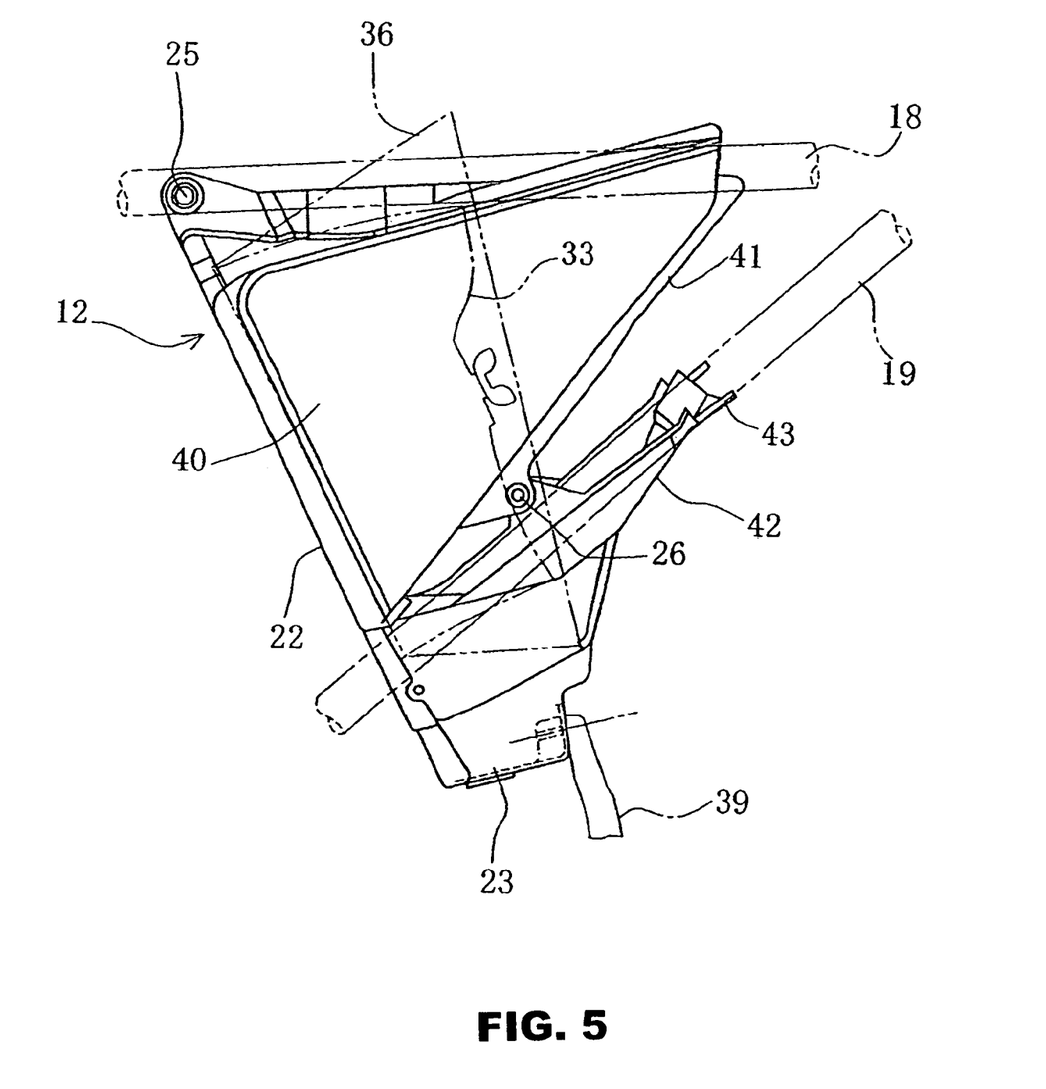
FIG. 5 is a side view of the air cleaner box.
Figure 6:
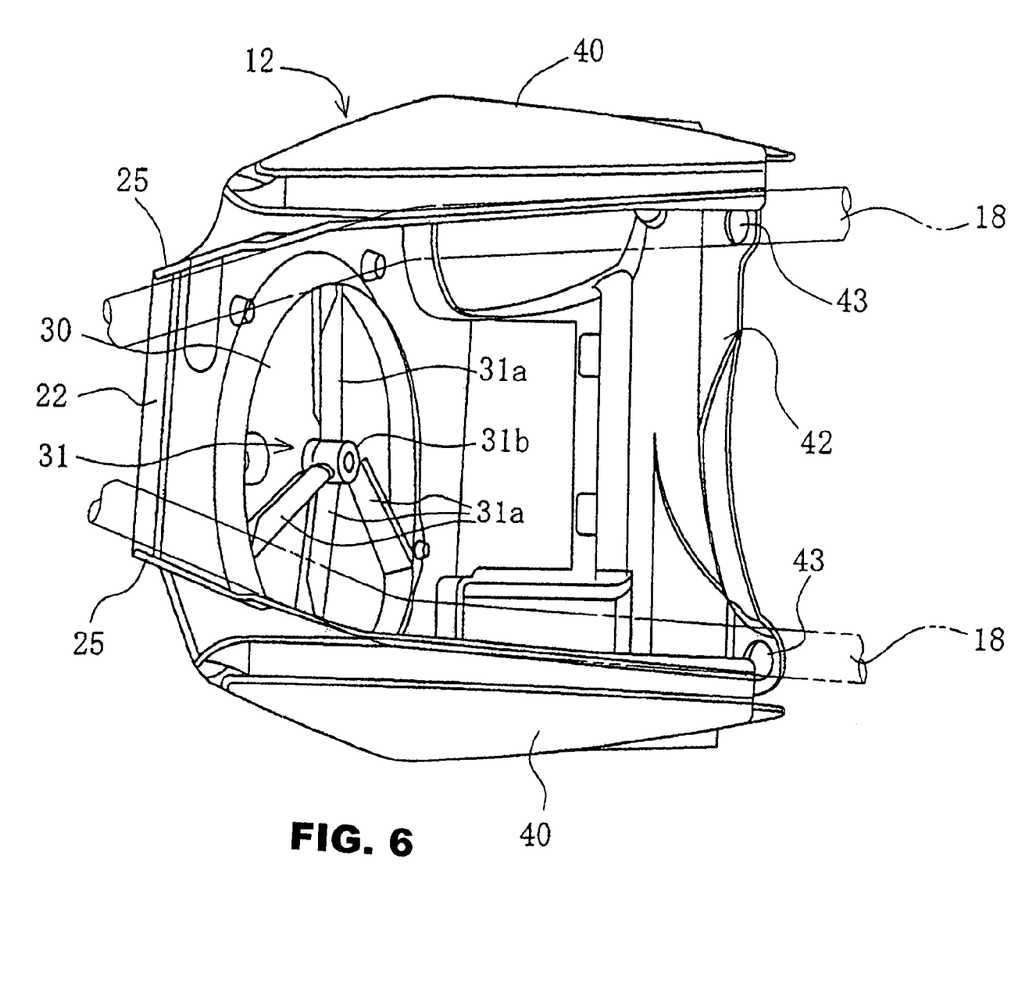
FIG. 6 is a plan view of the air cleaner.
Figure 8:
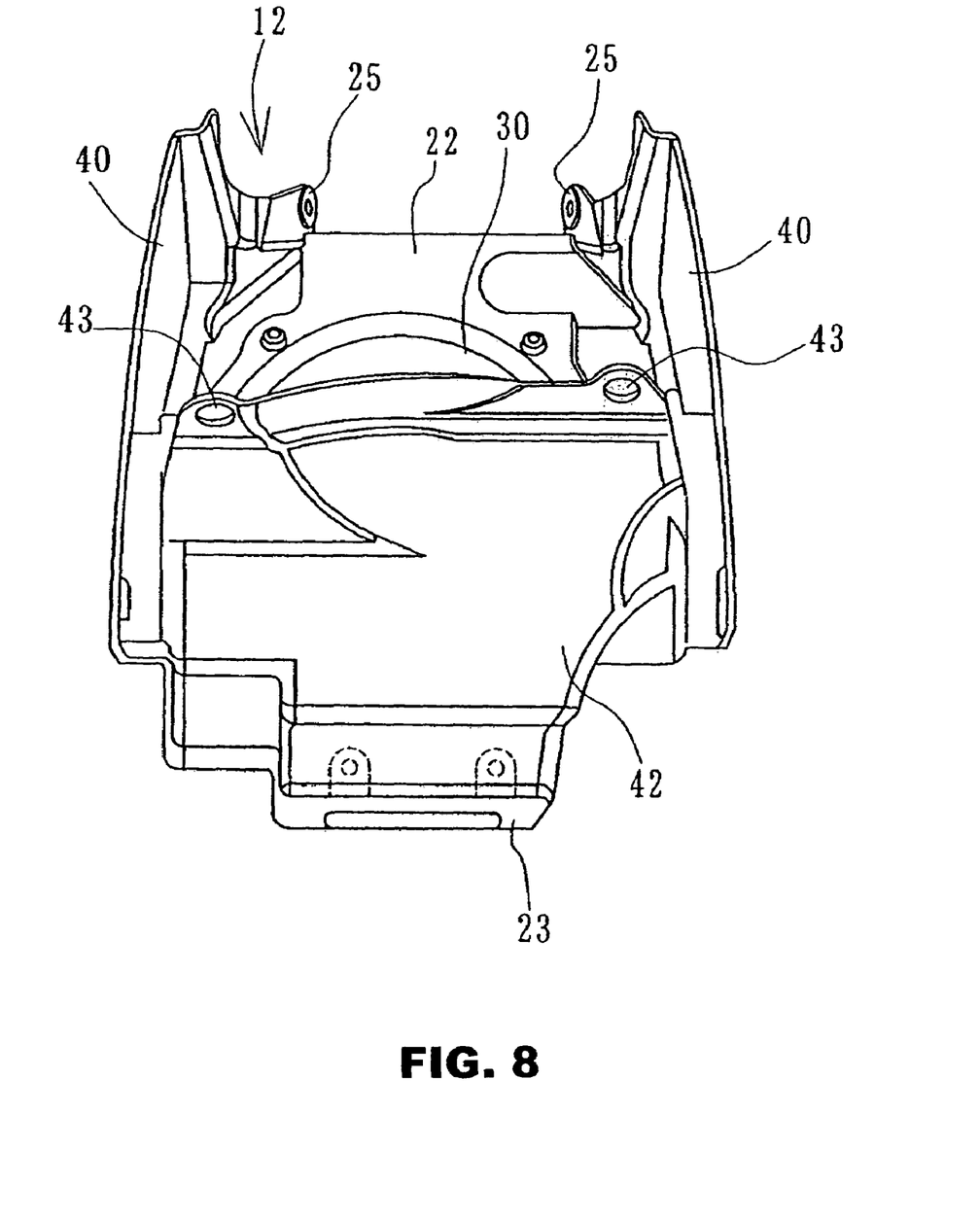
FIG. 8 is a back view of the air cleaner box.

The rectifying member 36 surrounds the entire circumference of outer periphery of the element 33 at a predetermined distance so that the outside air introduced from the rear opening 38 is rectified to flow in a certain direction with respect to the element 33, and is dispersed over the entire outer surface of the element 33 to be flowed therein uniformly without concentrating at a local area. The outside air is taken from behind the air cleaner 12 as shown by an arrow, is introduced inside from the opening 38 at the rear of the rectifying member 36, and is introduced into the element 33. The distance between the rectifying member 36 and the element 33 defines a space of a wedge shape in cross section which converges toward the front, so that the distance decreases gradually toward the front. FIG. 5 to FIG. 8 shows a box portion configuring the outside of the air cleaner 12. FIG. 5 is a side view thereof, FIG. 6 is a plan view thereof, FIG. 7 is a drawing showing the front side viewed from the direction indicated by an arrow A in FIG. 4 so as to oppose the opening 30, and FIG. 8 is a back view. As shown in FIG. 5, the side wall 40 formed into substantially triangular shape is formed with a shoulder 41 which is lowered inwardly by one level along the oblique side, so that the edge of a side wall of the front end of the rear fender 15, which is formed substantially into a rectangular shape, is overlapped therewith. The side wall at the front end of the rear fender 15 is connected via the connecting member 26. A rear wall 42 extending obliquely upward along the rear stay 19 toward the rear is formed below the shoulder 41. The left and right rear stays 19 and the rear walls 42 are different in height from each other, respectively (the rear stay on the right side of the vehicle body is omitted).

As shown in FIG. 6, the air cleaner 12 is opened upward and rearward. Mounting members 25 are formed on the left and right sides of the front wall 22. The rear wall 42, being inclined downward toward the front, is formed at the rear end at both left and right sides with connecting members 43 with respect to the front portion of the rear fender 15, and is connected via the connecting member 43 with the bottom side of the front end portion of the rear fender 15 overlapped with the rear wall 42.

As shown in FIG. 7, the front wall 22 has a shape tapered upward and downward, and the center portion which is the widest portion is formed with the opening 30 at a position shifted leftward when viewed toward the front. The opening 30 is a deformed circular shape having a substantially straight portion partly on the left side thereof. As shown in FIG. 8, the rear wall 42 extends upward from a bottom 44 to the level close to that of the upper portion of the opening 30.

Subsequently, the operation of the present embodiment will be described. In FIG. 2, the outside air is taken from the front air intake port 20 and the rear air intake port 21 formed on the side surface of the rear fender 15 located behind the air cleaner into the rear fender 15. As shown in FIG. 4, the inner space of the air cleaner 12 is in communication with the inner space of the front portion of the rear fender 15, not shown in FIG. 4, behind the dirty side 35, and the air cleaner 12 itself is an air-intake vacuum member. Therefore, the outside air taken into the rear fender 15 is directed toward the element 33 from behind the vehicle body at a flow velocity according to the extent of the negative pressure or the like as shown in FIG. 4 by arrows.

Then, since the entire circumference of the periphery of the element 33 is covered by the rectifying member 36 at a predetermined distance, and the rectifying member 36 is formed into the bell mouth shape opened toward the rear while increasing in diameter, the airflow is rectified so as to flow into a certain direction toward the element 33. The air passed through the element 33 and purified thereby enters into the clean side 34, and then delivered from the connecting tube 13 to the carburetor 17.

At this time, since the rectifying member 36 covers the entire circumference of the element 33, the outside air entered from the rear opening 38 into the inside of the rectifying member 36 is rectified so as to be dispersed uniformly and come into contact with the entire circumference of the element 33. Therefore, the entire element 33 can be utilized, and hence the efficiency of purification is improved.

Also, since the rectifying member 36 surrounds the entire circumference of the element 33, the air directed toward the element 33 is rectified, and hence a directionality of airflow flowing into the element and a negative pressure of the intake air can be optimized.

Consequently, the airflow flowing into the element 33 can hardly be affected by the shape of the wall surface of the air cleaner 12 and hence the stable airflow is achieved. Therefore, even when the negative pressure of the intake air varies due to a throttle opening, deformation of the road surface or the like the rectifying effect can be maintained, whereby adjustment for preventing actualization of a characteristic of excessive intake air such that air-intake portion on the surface of the element 33 changes locally can be achieved, thereby improving the output characteristic of the engine.

In particular, when the engine revolution is lowered and hence the flow velocity of the air is lowered, and the influence of the shape of the air cleaner on the negative pressure of the intake air increases, the rectifying effect as described above can be maintained. Therefore, the directionality of the airflow or the negative pressure of the intake air can be maintained properly and, in such a case as well, the output characteristic of the engine is achieved.

In addition, since the rectifying member 36 has the bell-mouth shape, and is opened rearward while increasing in diameter, the outside air taken from behind can be introduced to the periphery of the element 33 efficiently. Furthermore, since the outside air taken from the front air intake port 20 and the rear air intake port 21 disposed rearward is sucked into the element 33 located below, is purified, and is delivered to the carburetor 17 located in front from the opening 30 of the front wall 22 immediately, improvement of the air intake efficiency is achieved.

Still further, since the outside air is taken from the high position of the vehicle body, which is behind the element 33 at a higher level than that of the element, relatively clean air which contains less water and less dust can be taken. Therefore, it is suitable for off-road type vehicles which are often subjected to a large amount of water or mud. Also, it can be fixed using the element 33, without using an additional mounting member.

Furthermore, since the space S surrounded by the seat 11 on the upper side, the rear fender 15 on the lower side and the side covers 14 on the left and right sides is provided and the air cleaner 12 is disposed therein, the space S for arranging the air cleaner 12 can be secured easily. In addition, since at least part of the members which constitute the space S can be used for constituting the air cleaner 12, an advantageous structure such that the number of components of the air cleaner 12 can be reduced is obtained.

The present invention is not limited to the structure shown in the drawings as described above, and may be modified or applied in various manner within the scope of the invention. For example, the shape of the rectifying member 36 is not limited to the bell-mouth shape, but the funnel shape, cylindrical shape, vase shape, or various deformed shapes corresponding to the shape of the element 33 may be employed.

Although it is required to be a tubular shape in any case, the tubular shape must simply be a hollow shape, and hence irregularly deformed shapes of the opening other than the regular shape such as circle or oval are applicable. The shape in the longitudinal direction may be such that the centerline of the inner space is bent such as a curve, and may not be a straight line.

Also, the extent of covering the element 33 by the rectifying member 36 may simply be the entire circumference thereof, and may not cover entirely along in side view (FIG. 4). Only a certain percentage of the element 33 in the longitudinal direction must simply be covered.

In this detailed description of the preferred embodiments, reference is made to the accompanying drawings, which form a part hereof, and within which are shown by way of illustration specific embodiments by which the invention may be practiced. It is to be understood that other embodiments may be utilized and structural changes may be made without departing from the scope of the invention.

We claim:

1. An air cleaner device for a motorcycle, comprising:
   a box of an air cleaner,
   a cylindrical filter element disposed in said box, wherein air purified by said filter element is sent to an air-intake system of the motorcycle; and
   a rectifying member disposed inside said box and around an outer periphery of said cylindrical filter element, such that said rectifying member is spaced apart from the outer periphery of said cylindrical filter element at least a predetermined amount, and wherein said rectifying member has a substantially cylindrical shape and covers the entire outer periphery of said cylindrical filter element.

2. An air cleaner device for a motorcycle according to claim 1, further comprising:
   an air intake port for taking outside air into said box, wherein said air intake port is disposed rearwardly of said rectifying member, wherein,
   said box has a front wall having an exit opening therein for conducting purified air to the air in-take system of the motorcycle, and wherein said exit opening is covered by said cylindrical filter element, and further wherein said rectifying member is open in the rear.

3. The air cleaner device for a motorcycle, according to claim 1, wherein said air cleaner device is disposed in a space surrounded by a seat on an upper side thereof, a rear fender on a lower side thereof and side covers on left and right sides thereof.

* * * * *